(12) United States Patent
Anderton

(10) Patent No.: US 6,574,307 B1
(45) Date of Patent: Jun. 3, 2003

(54) METHOD AND APPARATUS FOR ENHANCING THE CONTRAST OF A MEDICAL DIAGNOSTIC IMAGE THAT INCLUDES FOREIGN OBJECTS

(75) Inventor: R. Larry Anderton, West Jordon, UT (US)

(73) Assignee: GE Medical Systems Global Technology Company LLC, Waukesha, WI (US)

( * ) Notice: Subject to any disclaimer, the term of this patent is extended or adjusted under 35 U.S.C. 154(b) by 0 days.

(21) Appl. No.: 09/990,643

(22) Filed: Nov. 21, 2001

(51) Int. Cl.[7] ................................................. H05G 1/64

(52) U.S. Cl. ........................ 378/98.7; 378/98.2; 378/207

(58) Field of Search ............................ 378/98.7, 4, 901, 378/98.2, 16, 207, 98.11, 98.12

(56) References Cited

U.S. PATENT DOCUMENTS

| 5,436,829 A | | 7/1995 | Hartley |
| 5,485,501 A | * | 1/1996 | Aichinger ................. 378/98.7 |
| 5,574,764 A | | 11/1996 | Granfors et al. |

* cited by examiner

*Primary Examiner*—Drew A. Dunn
(74) *Attorney, Agent, or Firm*—McAndrews, Held & Milloy, Ltd.; Peter J. Vogel; Michael A. Dellapena

(57) ABSTRACT

An x-ray system is provided utilizing an x-ray source and a detector to create x-ray data in a region of interest. The x-ray data comprises anatomic data, from the anatomy of a patient, and non-anatomic data, from a structure foreign to the patient. The anatomic and non-anatomic data may have non-overlapping grayscale distribution. A reject level is identified along the grayscale distribution. A processor module selects a minimum value for a transfer function based on the reject level and automatically calculates the transfer function to convert the x-ray data to display values. An x-ray image is then displayed based on the display values.

29 Claims, 4 Drawing Sheets

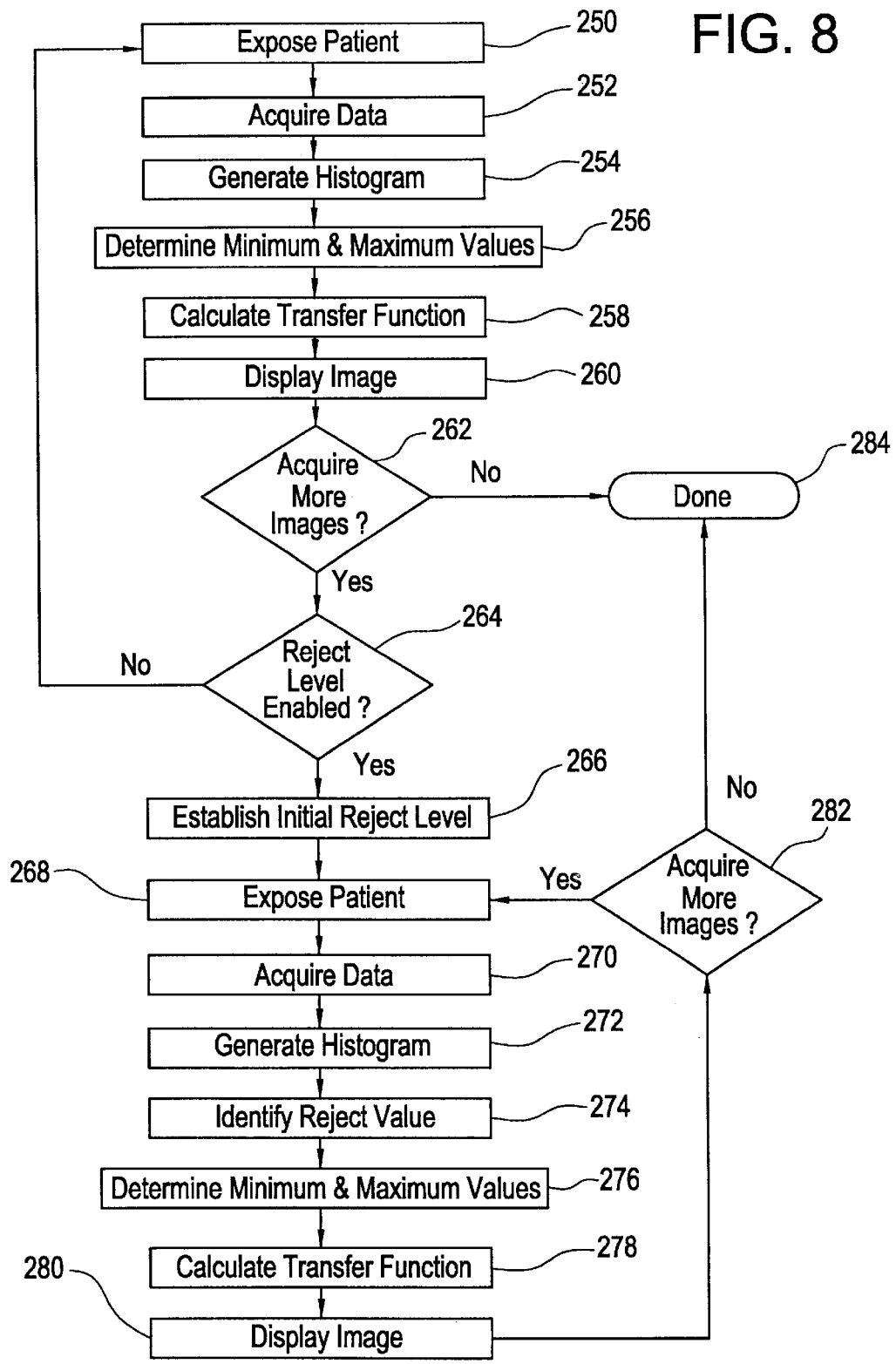

METHOD AND APPARATUS FOR ENHANCING THE CONTRAST OF A MEDICAL DIAGNOSTIC IMAGE THAT INCLUDES FOREIGN OBJECTS

BACKGROUND OF THE INVENTION

Certain embodiments of the present invention relate to medical diagnostic systems, and in particular, to techniques and apparatus for adjusting the contrast of displayed diagnostic images including foreign objects.

X-ray systems are well known for creating a series of internal images of a patient, such as cardiology, radiology and fluoroscopy systems. The patient is exposed to x-rays which are then detected after passing through the patient. The radiation is pulsed to produce a continuous sequence of images which are displayed real-time on a monitor. The x-rays are attenuated as they pass through the patient. The amount of attenuation experienced by the x-rays is represented in the image by the grayscale level of the pixels that are displayed. The contrast between grayscale levels is representative of the amount of attenuation.

Bones and different types of tissues attenuate the x-rays by different amounts, and thus are detected and displayed on an image monitor with different contrast levels. For example, bone will attenuate x-ray to a larger degree than muscle and may be displayed darker than surrounding anatomy. A region of anatomy containing only soft tissue may have a smaller range of contrast than a region of anatomy containing both soft tissue and bone. In addition, scattered radiation or using an increased kVp level to image a very large patient may also decrease the contrast range.

The level of radiation detected by the system is correlated to the contrast of the displayed image by a look-up table, or transfer function. In other words, the system uses the transfer function to assign a specific level of radiation to a specific grayscale level of the display. The system varies the range of the contrast for the displayed image associated with a particular range of grayscale levels by changing the shape (e.g., slope, offset, etc.) of the transfer function. The system may have multiple transfer functions, representing different mathematical models or shapes, from which one transfer function is selected to control the contrast of one or more display images. A particular transfer function is selected for different procedures or when imaging different anatomy.

The range of contrast used to display multiple images during a procedure may be set by the system and remain constant throughout the procedure. Therefore, a level of detected radiation, or a particular brightness level, is assigned a particular grayscale level for one or an entire series of scans. This is not advantageous, as during the same procedure, areas of interest within a patient which have various ranges of contrast may be scanned, and thus the contrast may appear to fluctuate. Some images may appear with a high level of contrast, containing areas that are very dark and areas that are very light, while other images may have low contrast and appear light or washed out. An operator may chose to adjust the contrast of the displayed image to correct for the change in contrast in the anatomy, but this is time consuming, error prone, and would need to be repeated as different tissues are examined.

To provide a more constant contrast throughout a procedure (fluoroscopic, cardiology, radiology or otherwise), automatic contrast compensation algorithms have been proposed. Automatic contrast compensation, or contrast management, is utilized to present a more pleasing image with better diagnostic utility. The images are examined for maximum and minimum brightness levels as they are acquired. The maximum and minimum brightness levels are then used to determine a new grayscale transfer function to enhance the contrast of the displayed image. Therefore, a radiologist may view images that contain bone and images containing only soft tissue during the same procedure without manually adjusting the contrast.

Unfortunately, automatic contrast compensation algorithms also are sensitive to opaque materials or instruments that may be contained within the patient or may be used by radiologists, surgeons or other persons, and may appear in an image. When a foreign item such as a caliper or bone screw enters the field of view, automatic contrast compensation, when enabled, identifies a new maximum and minimum brightness level and adjusts the contrast such that the foreign item is assigned the lower end of the available grayscale, or a range of the minimum brightness levels. Therefore, the grayscale range available to display the anatomic tissue of interest is decreased, and the displayed anatomic data reflects a sudden decrease in contrast.

An operator may be able to compensate for the appearance of an instrument by disabling the auto contrast option. The transfer function may then be changed by moving it to the left or right, essentially altering the maximum and minimum values, or by changing the slope, which would increase or decrease the grayscale range. Unfortunately, if the instrument is subsequently removed from the field of view, or if the contrast of the anatomic data changes, the image would once again need to be readjusted, either by re-enabling the auto contrast option or by manually changing the transfer function. This may be time consuming and cause excessive x-ray exposure to both the patient and the radiologist or technician as the transfer function is adjusted.

Thus, a need exists in the industry for a method and apparatus for adjusting the contrast of displayed diagnostic images that include foreign objects that address the problems noted above and previously experienced.

BRIEF SUMMARY OF THE INVENTION

In accordance with at least one embodiment, an x-ray system is provided utilizing an x-ray source and a detector to create x-ray data in a region of interest. The x-ray data comprises anatomic data, from the anatomy of a patient, and non-anatomic data, from a structure foreign to the patient. The anatomic and non-anatomic data have at least partially non-overlapping grayscale distribution. An input identifies a reject level along the grayscale distribution. A processor module selects a minimum value for a transfer function based in part on the reject level and automatically calculates the transfer function to convert the x-ray data to display values. A display then displays a x-ray image based on the display values.

In accordance with at least one embodiment, an automatic contrast control unit in a medical diagnostic apparatus is provided. An image processor is utilized to generate sample data of anatomic and non-anatomic structure in a region of interest. The anatomic and non-anatomic data have at least partially non-overlapping grayscale distribution. An input identifies a reject level along the grayscale distribution of the sample data. A histogram module generates a histogram of grayscale values for the anatomic and non-anatomic data. An automatic contrast module selects a minimum value for the transfer function based in part on the reject level and automatically calculates the transfer function to convert the sample data to display values.

In accordance with at least one embodiment, a method for enhancing the contrast of a diagnostic image is provided. The patient is exposed to x-rays, and then the x-ray data, comprising anatomic and non-anatomic data, is detected. The anatomic and non-anatomic data have at least partially non-overlapping grayscale distribution. A reject level located along the grayscale distribution is input. A minimum value based on the reject level is automatically calculated. A transfer function used to convert the x-ray data to display values is calculated based on the minimum value. An x-ray image is displayed based on the display values.

BRIEF DESCRIPTION OF SEVERAL VIEWS OF THE DRAWINGS

FIG. 8 illustrates a method for enhancing the contrast of diagnostic images acquired using automatic contrast compensation and a reject level in accordance with an embodiment of the present invention.

The foregoing summary, as well as the following detailed description of the embodiments of the present invention, will be better understood when read in conjunction with the appended drawings. It should be understood, however, that the present invention is not limited to the arrangements and instrumentality shown in the attached drawings.

DETAILED DESCRIPTION OF THE INVENTION

Figure 1:
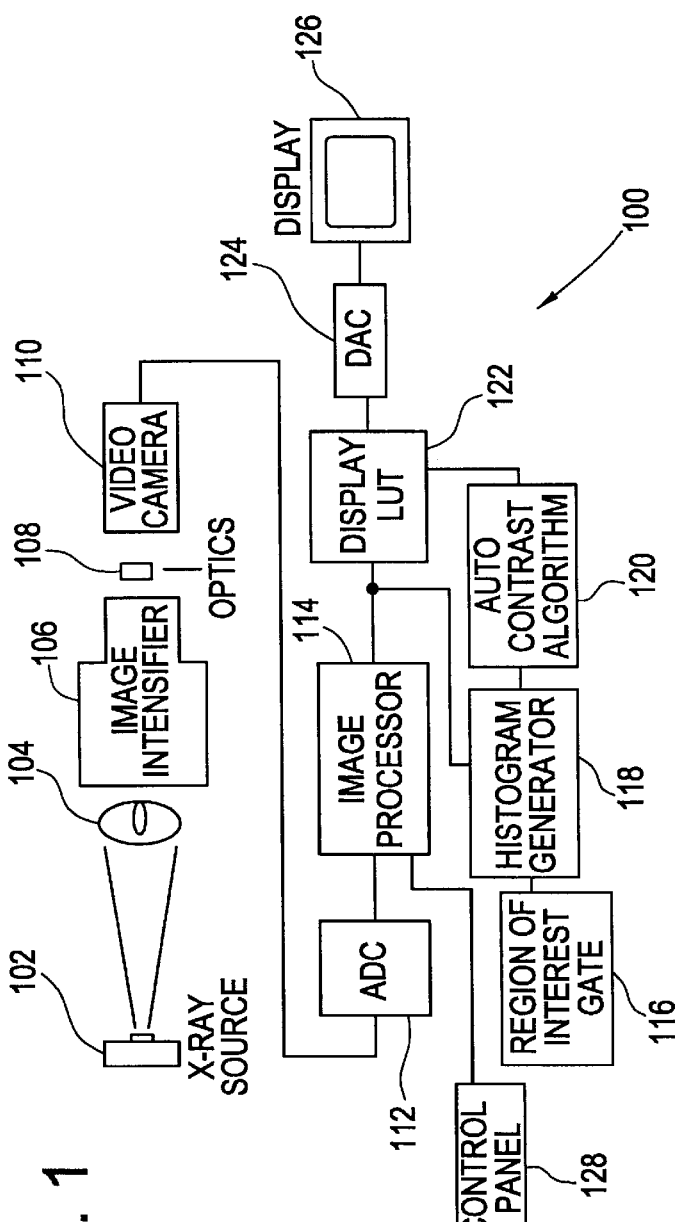
FIG. 1 illustrates a fluoroscopic x-ray system that utilizes automatic contrast compensation in accordance with an embodiment of the present invention.

FIG. 1 illustrates a fluoroscopic x-ray system that utilizes automatic contrast compensation in accordance with an embodiment of the present invention. The fluoroscopic system 100 includes an x-ray source 102 which directs an x-ray beam toward a patient 104. The patient 104 may be a human, animal, test phantom, or other object which includes anatomic structure. The image intensifier 106 detects the radiation that passes through the patient 104 and produces an image. The image is transferred via optics 108 to a CCD video camera 110. The CCD video camera 110 produces an analog video signal which is converted to a digital signal by an analog to digital converter (ADC) 112. Optionally, the ADC 112 may be included in the CCD video camera 110. Alternatively, a flat panel detector may replace the image intensifier 106, the optics 108 and the CCD video camera 110. The digital signal is then sent to the image processor 114.

The fluoroscopic system 100 includes a region of interest (ROI) gate 116, a histogram generator 118, and an auto contrast algorithm 120 that cooperate to perform automatic contrast compensation. The ROI gate 116, histogram generator 118 and auto contrast algorithm 120 are displayed separately on FIG. 1 for clarity, but may be included in the image processor 114 or other component of the fluoroscopic system 100. A control panel 128 is utilized by an operator to input data, such as to select a region of interest and a reject level, as discussed below. The output of the auto contrast algorithm 120 is passed to a display look-up table (LUT) 122. The display LUT 122 uses the parameters identified by the auto contrast algorithm 120 and correlates the levels of detected radiation in the digital image data from the image processor 114 to a selected look-up table, or transfer function. A digital to analog converter (DAC) 124 converts the output of the display LUT 122 from digital to analog, and passes the analog signal to display 126. The display 126 then displays a diagnostic image of the patient 104.

Figure 2:
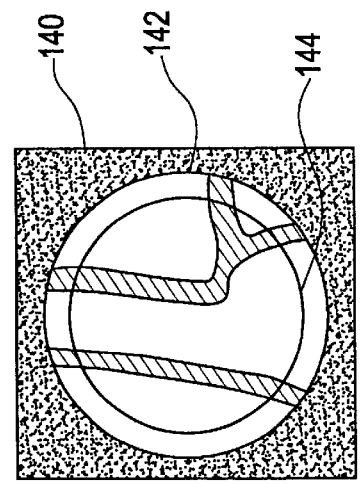
FIG. 2 illustrates a diagnostic image and a region of interest in accordance with an embodiment of the present invention.

FIG. 2 illustrates a diagnostic image and a region of interest in accordance with an embodiment of the present invention. A monitor 140 or similar device displays a diagnostic image 142 such as that displayed by display 126. The region of interest gate 116 utilizes predefined parameters or data input by an operator through the control panel 128 to identify the region of interest 144. The region of interest 144 is a part of the diagnostic image 142, and is typically 60 percent to 100 percent of the diameter of the diagnostic image 142. For example, the region of interest 144 may be fixed at 90 percent. The diagnostic data within the region of interest 144 will be used by the histogram generator 118 to build a histogram.

Figure 3:
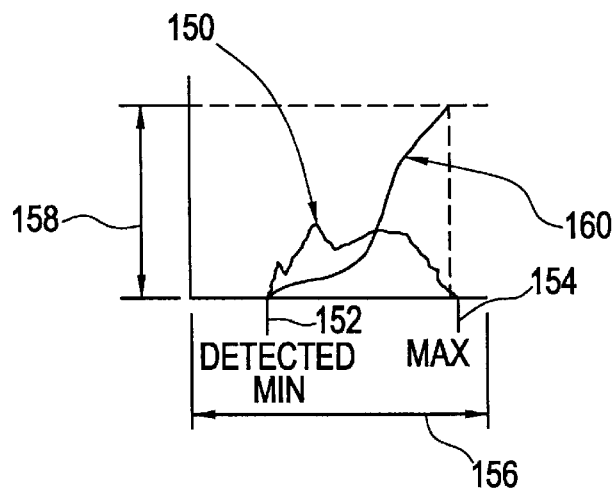
FIG. 3 illustrates a histogram and a transfer function generated from a region of interest in accordance with an embodiment of the present invention.

FIG. 3 illustrates a histogram and a transfer function generated from a region of interest in accordance with an embodiment of the present invention. The histogram generator 118 utilizes the digital image data output from the image processor 114 for the region of interest 144 over a raw data range 156 to generate a histogram 150. The auto contrast algorithm 120 determines the detected minimum value (detected MIN) 152 and the maximum value (MAX) 154 within the histogram 150 of the digital image data. The display LUT 122 utilizes the detected MIN 152 and MAX 154 values to generate a transfer function 160 over the displayed contrast range 158.

By way of example only, the displayed contrast range 158 may be divided into 256 discreet grayscale levels, wherein 0 indicates black and 255 indicates white. In a typical fluoroscopic system, the average values of the region of interest 144 may be displayed in the upper half of the displayed contrast range 158. For example, the brighter elements of the image may be displayed with a value in the range of 180 to 200, while the darkest elements may be displayed in the range of 50 to 100.

The histogram generator 118 may be comprised of a table of values stored in a memory (not shown), to which the digital image data is compared. Alternatively, the histogram generator 118 may use other electronic circuitry to detect the various white, black, and gray levels in the digital image data. The peak white (maximum) and peak black (minimum) signals may be used to generate offset and gain values to drive analog circuitry. This circuitry may be combined with an analog gate or clipping circuit, for example, that would reject black values below a certain level identified by the operator through the control panel 128.

The histogram generator 118 plots the histogram 150 on a graph such that the horizontal axis represents the level of detected radiation inside the region of interest 144 for the digital image data over the raw data range 156, and the vertical axis represents the displayed contrast range 158 available on the display 126. The displayed contrast range 158 may be a grayscale from black to white. Alternatively, the displayed contrast range 158 may be represented by a color scale, in which each color indicates a level, or band of levels, of signal value or detected radiation. The histogram generator 118 may plot each pixel's value in the histogram 150. Optionally, the digital image data may be divided into groups of pixels, such as a square of 10 pixels, and the average value of each group of pixels may be plotted. The histogram generator 118 may plot a histogram 150 for each individual image that is acquired, or for a certain percentage of the images that are acquired.

Once the histogram 150 is generated, the auto contrast algorithm 120 determines the detected MIN 152 and MAX 154 values within the raw data range 156. The detected MIN 152 is the lowest detected value in the region of interest 144, or the point(s) in the region of interest 144 with the least detected radiation. Pixels with detected radiation at or below the detected MIN 152 may be represented by the darkest element of the grayscale (i.e. black, or approaching black) on the display 126. The MAX 154 is the highest detected value in the region of interest 144 and indicates the points(s) with the most detected radiation. A pixel with detected radiation at or above the MAX 154 may be represented by the brightest element (i.e. white) on the display 126.

Additionally, the histogram 150 may be further filtered to eliminate discrepant values. For example, in order to identify the detected MIN 152, the auto contrast algorithm 120 may set a condition which must be met, such as having 10 values in a row plotted on the histogram 150 with greater than a predetermined number of pixels. Similar restrictions may be placed on the upper end to determine the MAX 154. Therefore, noise present at the minimum and maximum ends of the histogram 150 may not be considered. Alternatively, the auto contrast algorithm 120 may set a condition such that the gradient or slope of the histogram 150 may be below a predefined level as the histogram 150 approaches and combines with the threshold of 1% amplitude. Optionally, a convolving kernel or window may be utilized to smooth the histogram 150 with a spline or cubic function before the detected MIN 152 and MAX 154 are identified. It should be understood that further methods exist to identify the detected MIN 152 and MAX 154 values in the histogram 150, and any appropriate method may be utilized.

After the detected MIN 152 and MAX 154 have been identified, the display LUT 122 draws the transfer function 160 from the detected MIN 152 to the MAX 154 and translates the radiation levels of the histogram 150 to occupy the full contrast range of the display 126. Therefore, detected MIN 152 is typically assigned a value of zero or near zero on the vertical axis and MAX 154 is assigned a value of 255 on the vertical axis. The transfer function 160 is illustrated as non-linear, but it should be understood that any transfer function may be used. For example, the transfer function may be linear (such as the transfer function 184 illustrated in FIG. 5), logarithmic, exponential, S-shaped, hyperbolic tangent, or another shape that may not fit any mathematical model.

Figure 4:
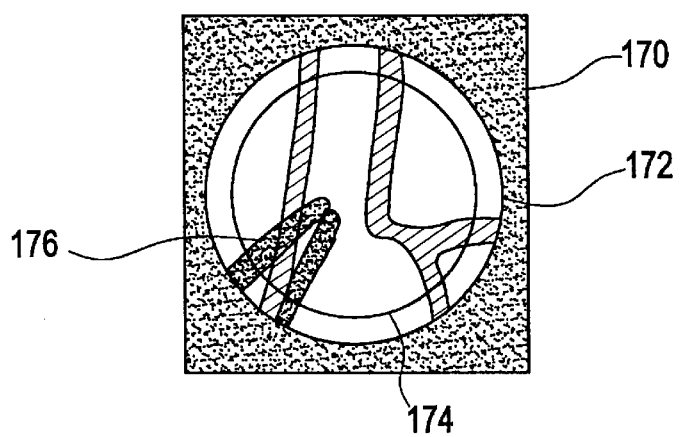
FIG. 4 illustrates a diagnostic image and a region of interest including a foreign object in accordance with an embodiment of the present invention.

FIG. 4 illustrates a diagnostic image and a region of interest including a foreign object in accordance with an embodiment of the present invention. FIG. 4 incorporates similar components as illustrated in FIG. 2, such as a monitor 170, diagnostic image 172, and region of interest 174. Additionally, a foreign object 176 is illustrated. The foreign object 176 is opaque, and thus transmits little or no radiation. The foreign object 176 may be a metallic tool or item, such as a caliper, lead glove, plate, blade, or screw. The foreign object 176 is included in the diagnostic image 172, and thus the diagnostic image 172 is comprised of both anatomic and non-anatomic data.

Figure 5:
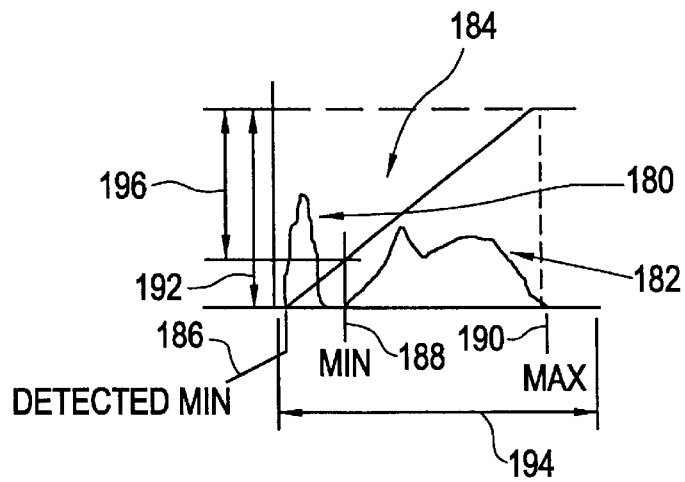
FIG. 5 illustrates two histograms and a transfer function generated from detected radiation in a region of interest including a foreign object in accordance with an embodiment of the present invention.

FIG. 5 illustrates two histograms and a transfer function generated from detected radiation in a region of interest including a foreign object in accordance with an embodiment of the present invention. The histogram generator 118 utilizes the raw data range 194 from the region of interest 174 to build histograms 180 and 182. Histogram 180 is a first distribution of the non-anatomic data of the foreign object 176. The detected MIN 186 is the lowest radiation level detected in the raw data range 194. Histogram 182 is a second distribution of the anatomic data of the patient 104 similar to histogram 150 of FIG. 3.

When a foreign object 176 is introduced into the region of interest 174, such as illustrated in FIG. 4, the auto contrast algorithm 120 identifies the detected MIN 186 as the lowest detectable radiation. The display LUT 122 generates the transfer function 184 based upon the detected MIN 186 and the MAX 190 with a displayed contrast range 192. Therefore, the displayed anatomic data may reflect a sudden decrease in contrast, because the contrast range 196 available to display the anatomic data from the patient 104 (identified as raw data range 194 between MIN 188 and MAX 190) is less than the displayed contrast range 192. Non-anatomic data is represented by the lower level of the transfer function 184, and anatomic data is pushed into the upper level of the transfer function 184.

Figure 6:
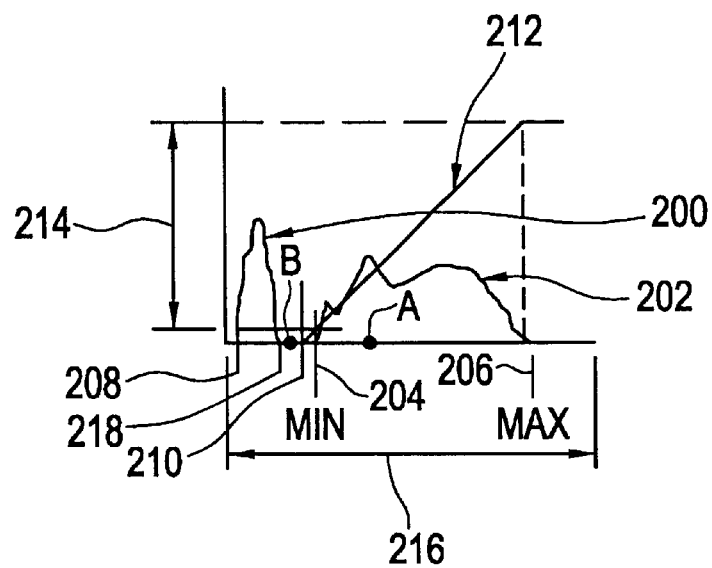
FIG. 6 illustrates two histograms and a transfer function utilizing a reject level in accordance with an embodiment of the present invention.

FIG. 6 illustrates two histograms and a transfer function utilizing a reject level in accordance with an embodiment of the present invention. Histogram 200 representing non-anatomic data detected from a foreign object 176 and histogram 202 representing anatomic data detected from the patient 104 are illustrated, similar to histograms 180 and 182 of FIG. 5. The auto contrast algorithm 120 determines MIN 204 and MAX 206 corresponding to histogram 202, and detected MIN 208 corresponding to histogram 200. An operator may input a reject level 210 through the control panel 128 as further discussed below.

FIG. 6 sets forth points A and B and non-anatomic MAX 218, which illustrates the maximum detected radiation for the foreign object 176. An exemplary method to acquire images comprised of both non-anatomic and anatomic structure will be described below in connection with points A and B and non-anatomic MAX 218.

By utilizing the auto contrast option alone, the transfer function 184 of FIG. 5 would be generated. However, the fluoroscopic system 100 further includes a user controlled minimum value, below which data in raw data range 216 is not utilized by the auto contrast algorithm 120 to determine the minimum and maximum values. The user controlled minimum value (reject level 210) may be used simultaneously with the auto contrast feature.

Figure 7:
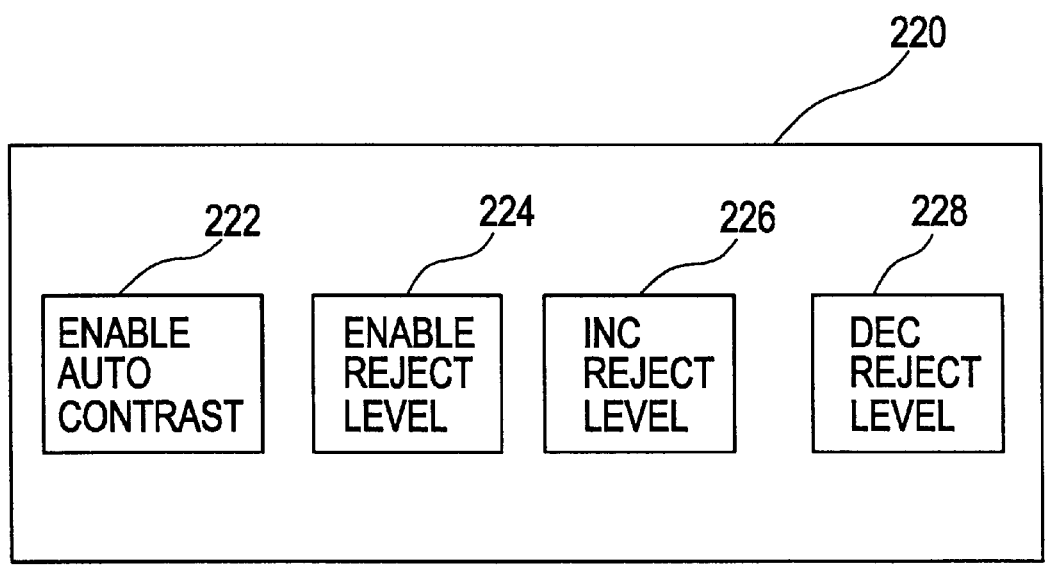
FIG. 7 illustrates a control panel in accordance with an embodiment of the present invention.

FIG. 7 illustrates a control panel in accordance with an embodiment of the present invention. The control panel 220 may be comprised of softkeys that activate functions such as ENABLE AUTO CONTRAST 222, ENABLE REJECT LEVEL 224, INCREASE (INC) REJECT LEVEL 226, and DECREASE (DEC) REJECT LEVEL 228. Alternatively, the functions accessed through softkeys 222–228 may be selected through one or more buttons, trackballs, switches, or a keyboard on one or more additional control panels associated with the fluoroscopic system 100. Alternatively, the selection of the ENABLE REJECT LEVEL 224, INC REJECT LEVEL 226, and DEC REJECT LEVEL 228 may be implemented through hardware. For example, the DAC 124 may be followed by a circuit including an amplifier that has a variable offset and gain. The circuit may be utilized to select the reject level 210 in order to alter the displayed contrast range 214 on the display 126 and other imaging devices, such as a printer.

The reject level 210 may be moved to any point along the raw data range 216. Optionally, the reject level 210 may be moved to a value between non-anatomic MAX 218 and MIN 204 in order that only digital image data above the reject level 210 is used by the auto contrast algorithm 120 to determine the minimum and maximum values. In other words, by using the reject level 210 to separate the detected values for non-anatomic data and anatomic data, the displayed contrast range 214 may be based on the MIN 204 and MAX 206 of the anatomic data. If, however, the reject level 210 is moved to the right of MIN 204, the anatomic data of the patient 104 will be affected and part of the image will be "clipped", or displayed as black. If the reject level 210 is moved to the left of non-anatomic MAX 218, a portion of the grayscale will be used to display the portion of histogram 200 to the right of the reject level 210, thus decreasing the grayscale available for anatomic data.

Although it may be possible to establish one reject level 210 which may be selected when a foreign object 176 or other opaque tool is introduced, both tools and anatomy have varying levels of density, and thus transmit varying levels of radiation. The reject level 210 may be initially set at the detected MIN 208, then the operator may use the INC REJECT LEVEL 226 to adjust the reject level 210 while monitoring the diagnostic image 172 on display 126. Alternatively, the reject level 210 may initially be set at a value determined to be below an average MIN 204 for a majority of studies.

It may not be desirable to use the maximum grayscale values for black and white when displaying diagnostic data. Therefore, moderation values may be utilized by the auto contrast algorithm 120 to moderate the MAX 206 and MIN 204 values used by the display LUT 122. As a result, values below the reject level 210 may be assigned a black, or blacker than black, value, differentiating the data below the reject level 210 from the anatomic data above the reject level 210.

In the event that the foreign object 176 is not distinctly more opaque than the patient 104, the operator may choose to cut off a portion of the foreign object 176 with the reject level 210. Therefore, although a portion of the foreign object 176 may be visible in shades of gray and not entirely represented by black as discussed previously, a larger range of the displayed contrast range 214 will be available to display the anatomic data represented by histogram 202.

While acquiring fluoroscopic images, the operator may select the ENABLE AUTO CONTRAST 222 so that the contrast of the displayed image is automatically adjusted. At the point at which a foreign object 176 is introduced into the region of interest 174, the operator may select ENABLE REJECT LEVEL 224. The operator may then use INC REJECT LEVEL 226 and/or DEC REJECT LEVEL 228 to adjust reject level 210 to a value above the non-anatomic data, which is represented by histogram 200. As a result, the minimum value of the anatomic data (MIN 204) becomes the minimum value determined by the auto contrast algorithm 120 and utilized by the display LUT 122 to calculate transfer function 212. Therefore, the reject level 210 may be introduced when needed (e.g., when a foreign object 176 is used), then turned off when not needed (e.g., when the foreign object 176 is removed from the region of interest 174), although it may not be necessary to disable the reject level 210 as the auto contrast option continues to adjust the displayed image automatically. Therefore, even if the foreign object 176 repeatedly enters and leaves the region of interest 174, the displayed anatomic image will not experience a change in contrast due to the foreign object 176, and there is no need to manually adjust the display contrast 214.

FIG. 8 illustrates a method for enhancing the contrast of diagnostic images acquired using automatic contrast compensation and a reject level in accordance with an embodiment of the present invention. For the method of FIG. 8, the auto contrast option is enabled. For example, the option may be enabled by selecting the softkey ENABLE AUTO CONTRAST 222, or through a keyboard or other user input as previously discussed. A look-up table used by the display LUT 122 to calculate the transfer function 212 is predefined. In addition, the region of interest 174 is identified, either through user input or by accessing a predefined value. The region of interest 174 identifies the raw data range 216 used by the histogram generator 188.

At step 250, x-ray source 102 exposes the patient 104 to x-ray radiation. The level of x-ray may be determined by the anatomy being imaged, the type of procedure, or the size of the patient 102, for example.

At step 252, the image intensifier 106, the optics 108, the video camera 110, the ADC 112, and the image processor 114 are utilized to acquire digital image data that may be displayed as diagnostic image 172. The digital image data may be stored in a storage device (not shown) to be further processed later.

At step 254, the histogram generator 188 generates one or more histograms based upon the raw data range 194 and the predefined region of interest 174. For example, if the region of interest 174 includes both anatomic and non-anatomic data as illustrated in FIG. 4, histograms 180 and 182 would be generated. If the region of interest 174 includes only anatomic data as illustrated in FIG. 2, histogram 150 of FIG. 3 would be generated. As stated previously, the histogram generator 118 may generate one or more histograms for each acquired image, or combine more than one acquired image to generate a histogram.

At step 256, the auto contrast algorithm 120 determines the minimum and maximum values of the raw data range 194 within the region of interest 174. For example, if foreign object 176 is not present in the region of interest 174, the detected MIN 152 and MAX 154 may be determined, such as in FIG. 3. If a foreign object 176 is present, the detected MIN 186 and MAX 190 may be determined, such as in FIG. 5.

Next, at step 258, the display LUT 122 utilizes the predetermined look-up table and the maximum and minimum values of step 256 to calculate transfer function 184. The transfer function 184 may associate the histograms 180 and 182 with a grayscale level, or displayed contrast range 192.

At step 260, the display 126, displays the image 172 by applying the transfer function 184 to the digital image data from the image processor 114. The minimum detected value of step 256 may be displayed as black, while the maximum detected value may be displayed as white. As discussed previously, a color scale may also be used. If a foreign object 176 is present in region of interest 174, the anatomic data may be displayed with a contrast range 196, which is less than the displayed contrast range 192. Therefore, the anatomic data may experience reduced contrast and appear washed out.

At step 262, the method determines whether more images are to be acquired. If yes, the flow passes to step 264. If no, flow passes to step 284 and the method is complete.

At step 264, the method determines whether the reject level option is enabled. If no, the method repeats steps 250 through 262, using the region of interest 174 to generate new histogram(s) 180 and 182, determine the detected MIN 186 and MAX 190, and calculate an associated transfer function 184. If the operator enables the reject level option, such as with the softkey ENABLE REJECT LEVEL 224, flow passes to step 266.

At step 266, the image processor 114 sets an initial reject level 210. The reject level 210 may be set to a level equal to or slightly higher than the detected MIN 208. At step 268, x-ray source 102 exposes the patient 104 to a pulse of x-ray radiation, similar to step 250. Next, at step 270, the image intensifier 106, the optics 108, the video camera 110, the ADC 112, and the image processor 114 are utilized to acquire digital image data that may be displayed as diagnostic image 172. At step 272, the histogram generator 118 generates one or more histograms 200 and 202, similar to step 254. The histogram generator 118 once again utilizes the region of interest 174 which was previously defined.

At step 274, the auto contrast algorithm 120 identifies the reject level 210. The reject level 210 may be at the initial value set in step 266. Alternatively, it is possible that the operator has adjusted the reject level 210 by using the softkeys INC REJECT LEVEL 226 and/or DEC REJECT LEVEL 228, or by using a keyboard or trackball as previously discussed.

At step 276, the auto contrast algorithm 120 determines MIN 204 and MAX 206. The auto contrast algorithm 120 only considers data in raw data range 216 greater than the reject level 210. For example, if the reject level 210 is set at point A, the minimum would also be set at point A. Any data associated with the histograms 200 and 202 below point A would be assigned the lowest grayscale value, such as black or blacker than black. If the reject level 210 is set at point B, the minimum would be set at MIN 204, because the auto contrast algorithm 120 looks for the lowest detected value in raw data range 216 above the reject level 210. As discussed previously, the histograms 200 and 202 may be filtered to eliminate discrepant values.

At step 278, the display LUT 122 utilizes the minimum and maximum values determined in step 276 to calculate a transfer function 212 according to the predefined look-up table. At step 280, the display 126 displays the image 172. If a foreign object 176, represented by histogram 200, is located within the region of interest 174, and the reject level 210 is located anywhere between non-anatomic MAX 218 and MIN 204, the foreign object 176 may be displayed as black. The anatomic data, represented by histogram 202, utilizes nearly all of the available displayed contrast range 214. Therefore, the anatomic data is displayed using the same displayed contrast range 214 as before the foreign object 176 was introduced. At step 282, the method determines whether more images are to be acquired. If no, flow passes to step 284 and the method is complete. If yes, flow returns to step 268.

By using the aforementioned methods and apparatus to acquire diagnostic images comprised of both anatomic and non-anatomic structure, images with improved diagnostic utility may be acquired. Therefore, a fluoroscopic system 100 that utilizes a reject level 210 together with auto contrast will enable a radiologist to conduct a fluoroscopic procedure utilizing the benefits of auto contrast without the disadvantage of decreasing the contrast available to display anatomic structure when opaque objects are introduced.

While the invention has been described with reference to at least one embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An x-ray system, comprising:
   an x-ray source and detector producing x-ray data having a grayscale distribution over an x-ray data range associated with a region of interest, said x-ray data comprising anatomic data indicative of an anatomic structure of a patient in the region of interest and comprising non-anatomic data indicative of structures in the region of interest foreign to the patient, said anatomic and non-anatomic data having grayscale values with at least partially non-overlapping grayscale distributions;
   an input identifying a reject level along said grayscale distribution of said x-ray data;
   a processor module automatically calculating a transfer function operative to convert the x-ray data to display values forming an x-ray image, said processor module selecting a minimum value for said transfer function based at least in part on said reject level; and
   a display displaying said x-ray image based on said display values.

2. The x-ray system of claim 1, wherein the transfer function constitutes a one-to-one correlation between grayscale values of said anatomic data and display values forming said x-ray image.

3. The x-ray system of claim 1, wherein a grayscale distribution of the anatomic data has an anatomic grayscale range shorter than a display range over which said display values are distributed, said transfer function expanding said anatomic data to entirely span said display range.

4. The x-ray system of claim 1, wherein said processor module identifies minimum and maximum grayscale values for said anatomic data and, based thereon, calculates said transfer function.

5. The x-ray system of claim 1, wherein said processor module generates a histogram of said grayscale values for said anatomic and non-anatomic data and automatically calculates said transfer function based at least in part on said histogram.

6. The x-ray system of claim 1, wherein said transfer function is linear.

7. The x-ray system of claim 1, wherein said transfer function is non-linear.

8. The x-ray system of claim 1, wherein said grayscale distribution for said non-anatomic data is separate and distinct from said grayscale distribution for said anatomic data.

9. The x-ray system of claim 1, wherein said input identifies said reject level to be between grayscale distributions of said anatomic and non-anatomic data.

10. The x-ray system of claim 1, wherein, when said reject level is less than a minimum grayscale value of said anatomic data, said processor module automatically setting a minimum value for said transfer function based on said minimum grayscale value of said anatomic data independent of said reject level.

11. The x-ray system of claim 1, wherein, when said reject level is greater than a minimum grayscale value of said anatomic data, said processor module automatically setting the minimum value of the transfer function based on the reject level independent of the minimum grayscale value.

12. In a medical diagnostic apparatus, an automatic contrast control unit, comprising:
   an image processor generating sample data having a grayscale distribution over a sample data range associated with a region of interest, said sample data comprising anatomic data indicative of anatomy of a patient in the region of interest and comprising non-anatomic data indicative of structures in the region of interest foreign to the patient, said anatomic and non-anatomic data having grayscale values with at least partially non-overlapping grayscale distributions;
   an input identifying a reject level along said grayscale distribution of said sample data;
   a histogram module generating a histogram of grayscale values for said anatomic and non-anatomic data; and
   an automatic contrast module automatically calculating a transfer function operative to convert the sample data to display values forming a diagnostic image, said automatic contrast module selecting a minimum value for said transfer function based at least in part on said reject level.

13. The automatic contrast control unit of claim 12, the input further comprising a softkey.

14. The automatic contrast control unit of claim 12, the input further comprising a manual dial.

15. The automatic contrast control unit of claim 12, wherein said medical diagnostic apparatus is an x-ray system, wherein said sample data is x-ray data.

16. The automatic contrast control unit of claim 12, wherein said grayscale distribution for said non-anatomic data is separate and distinct from said grayscale distribution for said anatomic data.

17. The automatic contrast control unit of claim 12, wherein said input identifies said reject level to be between grayscale distributions of said anatomic and non-anatomic data.

18. The automatic contrast control unit of claim 12, wherein, when said reject level is less than a minimum grayscale value of said anatomic data, said automatic contrast module automatically setting a minimum value for said transfer function based on said minimum grayscale value of said anatomic data independent of said reject level.

19. The automatic contrast control unit of claim 12, wherein, when said reject level is greater than a minimum grayscale value of said anatomic data, said automatic contrast module automatically setting the minimum value of the transfer function based on the reject level independent of the minimum grayscale value.

20. A method for enhancing the contrast of a diagnostic image, the method comprising:
   exposing a patient to x-rays;
   detecting x-ray data comprising anatomic data indicative of anatomy of the patient and non-anatomic data indicative of structures foreign to the patient, said anatomic and non-anatomic data having grayscale values with at least partially non-overlapping grayscale distributions;
   manually inputting a reject level, said reject level being located along said grayscale distribution;
   automatically calculating a minimum value along said at least partially non-overlapping grayscale distributions based on said reject level;
   automatically calculating a transfer function operative to convert said x-ray data to display values based on said minimum value; and
   displaying an x-ray image based on said display values.

21. The method of claim 20, further comprising generating a histogram based on said x-ray data, said histogram comprising a first distribution portion representative of said non-anatomic data and a second distribution portion representative of said anatomic data, said first and second distribution portions being entirely separate and distinct from one another.

22. The method of claim 20, further comprising:
   generating a histogram based on said x-ray data, said histogram comprising a first distribution portion representative of said non-anatomic data and a second distribution representative of said anatomic data; and
   displaying the first distribution portion as a single grayscale value.

23. The method of claim 20, further comprising displaying said x-ray data below said reject level with a single grayscale value.

24. The method of claim 20, further comprising setting said reject level to be less than said minimum value.

25. The method of claim 20, further comprising setting said reject level to be substantially the same as said minimum value.

26. The method of claim 20, wherein said structures foreign to said patient are opaque.

27. The method of claim 20, further comprising detecting x-ray data comprising anatomic data, wherein said grayscale distribution indicative of anatomic data based on said x-ray data comprising anatomic and non-anatomic data is substantially similar to said grayscale distribution indicative of said x-ray data comprising anatomic data.

28. The method of claim 20, wherein said minimum value is based on a distribution representative of said anatomic data.

29. The method of claim 20, further comprising calculating a maximum value, wherein said maximum and minimum values are based on said x-ray data in a region of interest.

* * * * *